US009518823B2

(12) United States Patent
Hill

(10) Patent No.: US 9,518,823 B2
(45) Date of Patent: Dec. 13, 2016

(54) ADJUSTABLE LASER LEVELING DEVICE AND METHOD

(71) Applicant: Jayson Hill, Denver, CO (US)

(72) Inventor: Jayson Hill, Denver, CO (US)

(*) Notice: Subject to any disclaimer, the term of this patent is extended or adjusted under 35 U.S.C. 154(b) by 139 days.

(21) Appl. No.: 14/602,430

(22) Filed: Jan. 22, 2015

(65) Prior Publication Data

US 2015/0204666 A1   Jul. 23, 2015

Related U.S. Application Data

(60) Provisional application No. 61/930,645, filed on Jan. 23, 2014, provisional application No. 62/049,241, filed on Sep. 11, 2014.

(51) Int. Cl.
*G01C 15/00* (2006.01)

(52) U.S. Cl.
CPC .................... *G01C 15/004* (2013.01)

(58) Field of Classification Search
CPC ........................................ G01C 15/04
USPC .......................... 33/286, 379, 390
See application file for complete search history.

(56) References Cited

U.S. PATENT DOCUMENTS

| 3,762,820 | A | | 10/1973 | Zoot et al. |
| 4,712,953 | A | * | 12/1987 | Witzel ................. B23Q 15/22 33/286 |
| 5,144,487 | A | | 9/1992 | Hersey |
| 5,402,226 | A | | 3/1995 | Matthews et al. |
| 5,836,081 | A | * | 11/1998 | Orosz, Jr. ............ A61B 5/0215 33/290 |
| 5,894,675 | A | | 4/1999 | Cericola |
| 6,021,229 | A | | 2/2000 | Takashima et al. |
| 6,202,312 | B1 | | 3/2001 | Rando |
| 6,308,428 | B1 | | 10/2001 | Creighton, III |
| 6,487,783 | B1 | | 12/2002 | Thomas, Jr. |
| 6,628,378 | B1 | | 9/2003 | Marangoni et al. |
| 7,003,892 | B2 | | 2/2006 | Eaton et al. |
| 7,073,268 | B1 | | 7/2006 | Etter et al. |
| 7,181,853 | B2 | | 2/2007 | Heger et al. |
| 7,346,847 | B2 | | 3/2008 | Etter et al. |
| 7,370,428 | B2 | * | 5/2008 | Decker, Jr. ............... G01C 9/06 33/366.11 |
| 7,454,840 | B2 | | 11/2008 | Delfini et al. |
| 7,513,051 | B2 | | 4/2009 | Spanski et al. |
| 8,266,807 | B2 | | 9/2012 | Olsen |
| 2004/0187327 | A1 | | 9/2004 | Levine |
| 2005/0198845 | A1 | * | 9/2005 | Robinson ............. G01C 15/004 33/227 |
| 2005/0206891 | A1 | | 9/2005 | Khubani |
| 2006/0185181 | A1 | | 8/2006 | Long et al. |
| 2006/0283029 | A1 | | 12/2006 | Jan et al. |

(Continued)

OTHER PUBLICATIONS

Written Opinion and International Search Report for PCT/US2015/012425 (mailed May 19, 2015).

*Primary Examiner* — G. Bradley Bennett
(74) *Attorney, Agent, or Firm* — Kutak Rock LLP; Neil L. Arney

(57) ABSTRACT

A device and method for determining level planes using one or more lasers. The device may include a single base or a plurality of bases that allow lasers to be attached to project laser lines across a work surface. The device also may include notches to insert and connect a measuring device at a center of a base to facilitate accurate measurements and markings along the projected laser lines.

18 Claims, 8 Drawing Sheets

(56) References Cited

U.S. PATENT DOCUMENTS

| | | | |
|---|---|---|---|
| 2008/0276473 A1* | 11/2008 | Raschella | F41G 1/35 33/286 |
| 2010/0122466 A1 | 5/2010 | Hemingway et al. | |
| 2012/0042527 A1* | 2/2012 | Olsen | G01C 15/12 33/228 |
| 2012/0279782 A1 | 11/2012 | O'Reilly | |
| 2013/0298413 A1 | 11/2013 | Kehl et al. | |
| 2013/0340268 A1* | 12/2013 | Gulunav | G01C 15/004 33/291 |
| 2014/0090264 A1 | 4/2014 | Li | |
| 2014/0115907 A1 | 5/2014 | Gamon | |
| 2014/0237833 A1 | 8/2014 | Schubert et al. | |
| 2015/0052763 A1* | 2/2015 | Zhang | G01C 15/004 33/281 |
| 2015/0369639 A1* | 12/2015 | Lukic | G01D 11/245 73/431 |
| 2016/0041359 A1* | 2/2016 | Gaskin | G01B 11/272 250/573 |

* cited by examiner

ADJUSTABLE LASER LEVELING DEVICE AND METHOD

CROSS-REFERENCE TO RELATED APPLICATIONS

This application claims priority pursuant to 35 U.S.C. 119(e) to co-pending U.S. Provisional Patent Applications, Ser. No. 61/930,645, filed Jan. 23, 2014, and Ser. No. 62/049,241, filed Sep. 11, 2014, the entire disclosures of which are incorporated herein by reference.

FIELD OF INVENTION

The present invention relates to an adjustable laser leveling device and related method.

BACKGROUND

There are various tools on the market that utilize lasers. However, such tools are generally limited to providing reference laser lines and require the user to move the tool and interrupt the reference lines in order to complete complex layouts. What is needed is a device to facilitate leveling and installation of objects and fixtures, such as shelving, home decor, and tile without moving or interrupting the device continuously. Further what is needed is a device that accommodates measuring devices to allow the user to make measurements along the referenced laser lines to facilitate the layouts.

SUMMARY OF INVENTION

The following summary is provided to facilitate an understanding of some of the innovative features unique to the present invention. The present invention is not intended to be limited by this summary.

The present invention relates to a laser leveling device to facilitate leveling and installation of objects and fixtures, such as shelving and home decor. In a preferred embodiment, the laser leveling device has a plurality of bases that may be temporarily affixed to a wall or other work surface, using known materials such as removable adhesive tabs or strips.

A preferred embodiment also includes a laser assembly that can be removably and interchangeably attached to any of a plurality of bases. Said laser assembly contains a plurality of lasers arranged at preferred angles, including orthogonal angles, allowing laser lines to be emitted out of multiple sides of the laser leveling device and projected onto a wall or other work surface.

A preferred embodiment of the present invention also includes a means for leveling the bases and thus the emitted laser lines both vertically and horizontally on a work surface, such as a level assembly that is removably and interchangeably attachable to any of the plurality of bases or the use of self-leveling lasers.

The present invention advantageously allows level laser lines to be established, broadcast, and held on a wall or other work surface while the user makes multiple layout marks. More particularly, the present invention facilitates leveling and arrangement of objects on a wall or other work surface by allowing the user to successfully layout a project without moving the device or interrupting the reference lines continuously. When it does become necessary to move the laser assembly to provide additional reference lines on a work surface, additional of the plurality of bases may be located on existing reference lines to facilitate and expedite the movement of the laser assembly.

A preferred embodiment of the laser leveling device of the present invention also includes a plurality of notches oriented at or near the center of each of the plurality of bases to temporarily affix or hook an end of a tape measure or other known measuring device. The notches may be constructed as an indentation of material, a protrusion of material, or another alteration of material on the base to facilitate temporarily receiving the measuring device. The notches allow the user to make accurate layout marks from the center point of a base to any point along the laser lines emitted from the device. The notches may optionally be magnetized to facilitate the temporary attachment of the measuring device. The notches also facilitate origination of measurements from the center of the device.

A preferred embodiment of the device additionally includes a means for aligning or centering a base at a predetermined location on a wall or other work surface, such as a bull's eye opening or window at the center of the base.

The plurality of bases may be configured on a wall or other work surface so that the emitted lasers project through one or more of the plurality of bases to allow the user to make measurements along any laser line emitted from the laser device and through a base.

An alternative embodiment of the present invention is a laser leveling device with a base that may be removably affixed to a wall or other work surface and a laser assembly rotatably mounted to the base, wherein the user may rotatably adjust the laser assembly to orient the laser to a desired position. This alternative embodiment also includes one or more notches oriented at or near the center of the bases to temporarily affix or hook an end of a tape measure or other known measuring device. The notches may rotate with the lasers to allow for the measuring device to measure points from the center of the base to any point along the laser lines being projected onto a work surface.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DESCRIPTION OF DRAWINGS

The accompanying figures are incorporated herein and form a part of the specification for the present invention and further illustrate the present invention.

DETAILED DESCRIPTION OF INVENTION

Figure 1:
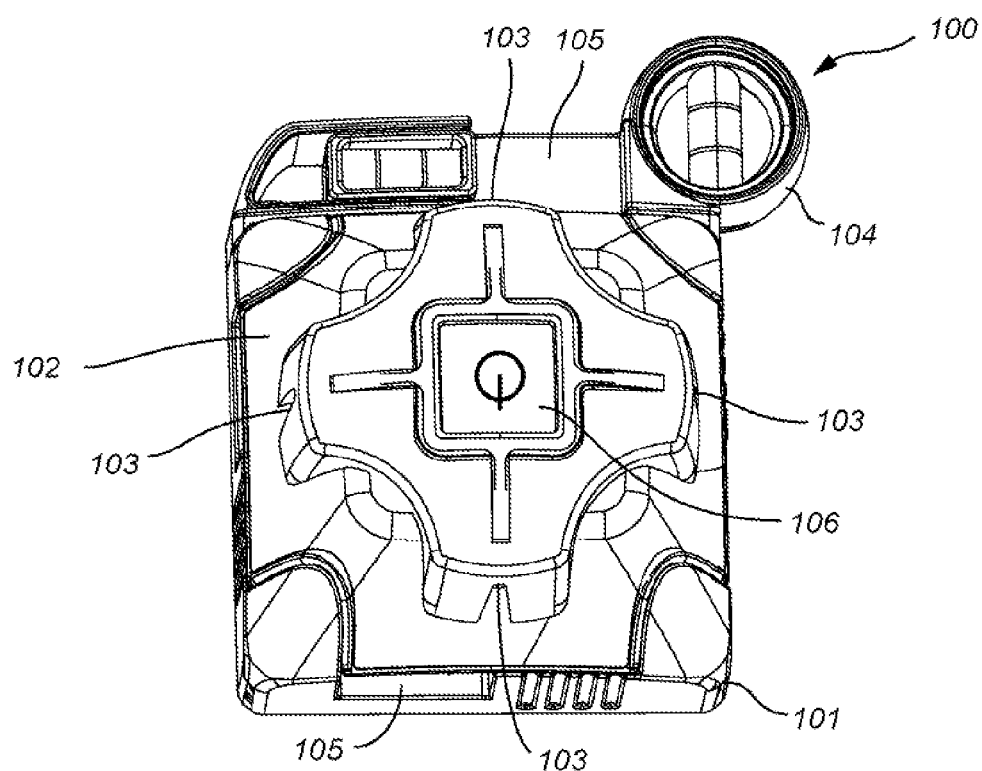
FIG. 1 is a top view of the laser leveling device, according to an embodiment of the present invention.

The present invention is best understood by reference to the detailed drawings and description set forth herein. Embodiments of the invention are discussed below with reference to the drawings. However, those skilled in the art will readily appreciate that the detailed description given herein with respect to the drawings is for explanatory purposes as the invention extends beyond the limited embodiments described. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number for a claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations. However, the use of such phrases should not be construed to imply a claim recitation by the indefinite articles "a" or "an" limits any particular claim containing such claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of claim recitations is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Throughout this disclosure, examples will be provided for using the laser leveling device. However, those of skill in the art will appreciate additional applications for the laser leveling device. Uses of the present invention may relate to, for example, hanging shelving, picture collage walls, art walls, closet shelving, decorative shelving, curtain rods, towel bars, fixed hang holes, tile work, cabinets, built-in cabinets/shelving, kitchen cabinets, door hardware, wall mounted lighting fixtures, flat screen TV mounts, and other installations.

The invention provides a laser leveling device characterized by horizontal and/or vertical lasers integrated into a laser assembly attachable to a base. The lasers may be used to provide level laser lines for accurate and level layout of virtually any project. The lasers are powered and may emanate out of all sides of the device. The lasers may be self-leveling or manually leveled. Additionally, this device may include notches, which may optionally be magnetized, oriented at or near a center of the device. An end of a tape measure or other measuring tool may be temporarily located adjacent to the notch to make accurate layout marks from the center of a base to any point along the laser lines emanating from the device. The notches ensure that measurements can originate from the center of the device. A bullseye-like, open hole at the center of the base may allow the user to align the base of the tool with markings made on a work surface (i.e. a wall). Skilled artisans will appreciate that the notches may be constructed as an indentation of material, a protrusion of material, or another alteration of material on a base and/or extended base to facilitate temporarily receiving the measuring device, without limitation.

As discussed above, the present invention provides a laser leveling device that can be used to determine a level line from a central or other location. The device may include a plurality of bases. A torpedo level attachment may be connected or located adjacent to the base. Similarly, an extended torpedo level attachment may be connected or located adjacent to a base.

As an example, the laser assembly may be attached to any of a plurality of bases, which are removably affixed to a work surface, allowing a laser line to be emitted from all four sides of the base. Skilled artisans will appreciate embodiments with a laser emitting from less than all of the sides included by a base to be within the scope of the present invention. Additionally, those of skill in the art will appreciate a base that includes more or less than four sides.

The bases may include notches located approximately at the center of the base that will allow the user to hook a tape measure into the base to make measurements and/or markings along any of the laser lines emitted from a base or a laser device attached to the base described above. The notches may advantageously be oriented approximately at the center of one or more of the bases, allowing a user to hook a tape measure into the base to make measurements and/or markings from the center of the base to any point along the laser lines emitted from the base or other components.

The device of the present invention may produce static, level laser lines that are broadcast and held on a work surface, such as a wall, while a user makes multiple layout marks. Making layout marks may advantageously allow a user to indicate one or more positions without continually having to interrupt or move the device to successfully layout a project.

To illustrate embodiments of the present invention, reference is made to the drawings. FIG. 1 shows a top view of a preferred embodiment of the laser leveling device 100 of the present invention and specifically shows a base 101, the laser assembly 102 with four lasers 103, the level assembly 104, notches 105 for inserting and temporarily attaching a measuring device, and a power button 106 for powering on one or more of the lasers 103. In this embodiment having four sides, a laser line may be emitted from each side of the laser assembly 102 with laser lines emitted at predetermined angles, including orthogonal angles, across the wall or other work surface. In a preferred embodiment, the laser leveling device 100 includes a plurality of bases 101. The use of multiple bases 101 allows a user to stretch out their layout possibilities by aligning the bases 101 over reference marks made on a work surface and then moving the laser assembly 102 from base 101 to base 101 to provide additional reference lines. In a preferred embodiment, bases 101 include a passage that allows laser lines to pass through, over, and/or underneath the bases 101 for accurate alignment of the base 101 and assistance with creating a grid of leveled laser lines.

Figure 2:
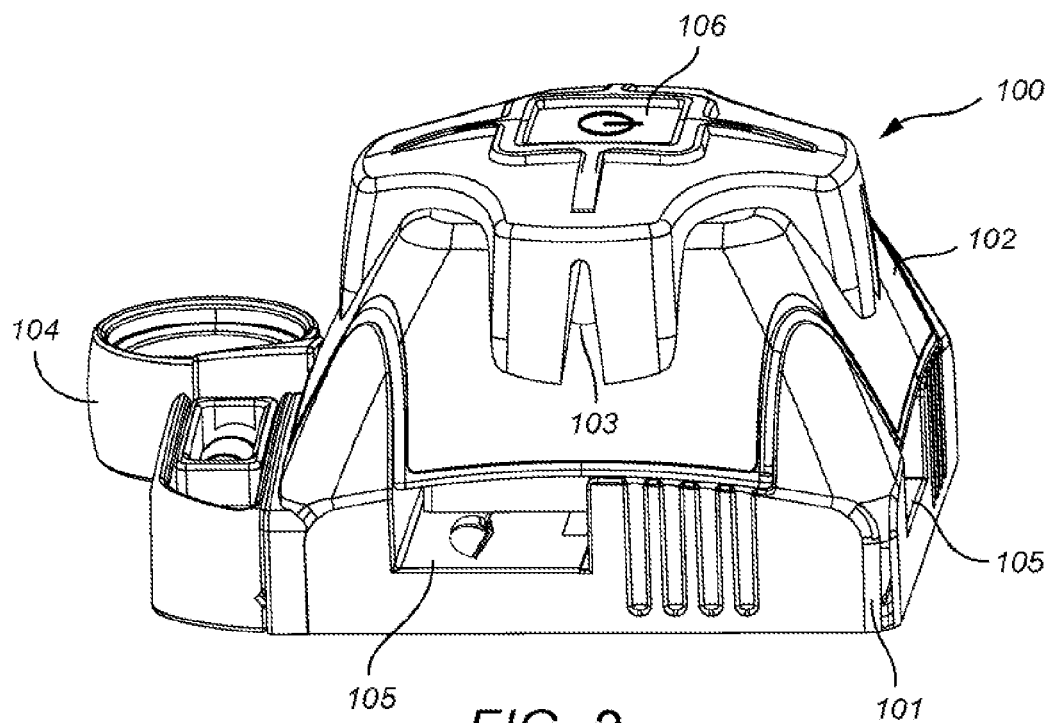
FIG. 2 is a side perspective view of the laser leveling device, according to an embodiment of the present invention.

FIG. 2 is a side perspective view of a preferred embodiment of the laser leveling device 100 of the present invention and specifically shows a base 101, a laser assembly 102, including a laser 103 and a power button 106 for powering the lasers 103 on and off, a level assembly 104 removably attached to the base 101, and notches 105 for inserting and temporarily attaching a measuring device. In a preferred embodiment, the notches 105 are located so that the end of the tape measure or other measuring device may be set at the center of the base 101. The notches 105 also may be magnetized to allow the user to hook the end of a tape measure into the notches 105 to facilitate accurate measurements and markings from the center of a base 101 to a point along any of the leveled laser lines that emanate from the laser assembly 102.

Figure 3:
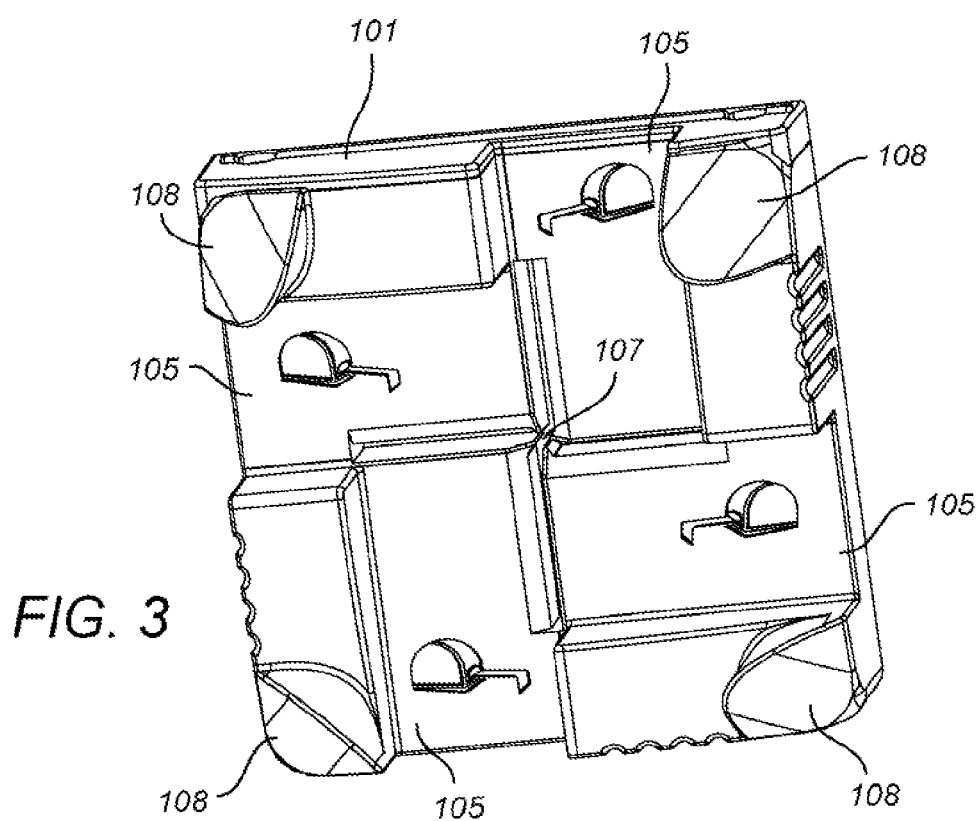
FIG. 3 is a top view of a base of the laser leveling device, according to an embodiment of the present invention.

FIG. 3 is a top view of a preferred embodiment of a base 101 of the present invention. FIG. 3 shows four notches 105 for inserting and temporarily hooking the end of a tape measure or other measuring device to allow measurements to be made along emitted laser lines. FIG. 3 also reveals a bull's eye-type opening 107 at the center of base 101 to allow the base to be centered or aligned at a predetermined location on a work surface. Further, FIG. 3 shows four pillars 108 that receive and secure the laser assembly 102. The attachable laser assembly 102 may seat into the base 101 with magnetized feet that temporarily connect the laser assembly to the base 101.

Figure 4:
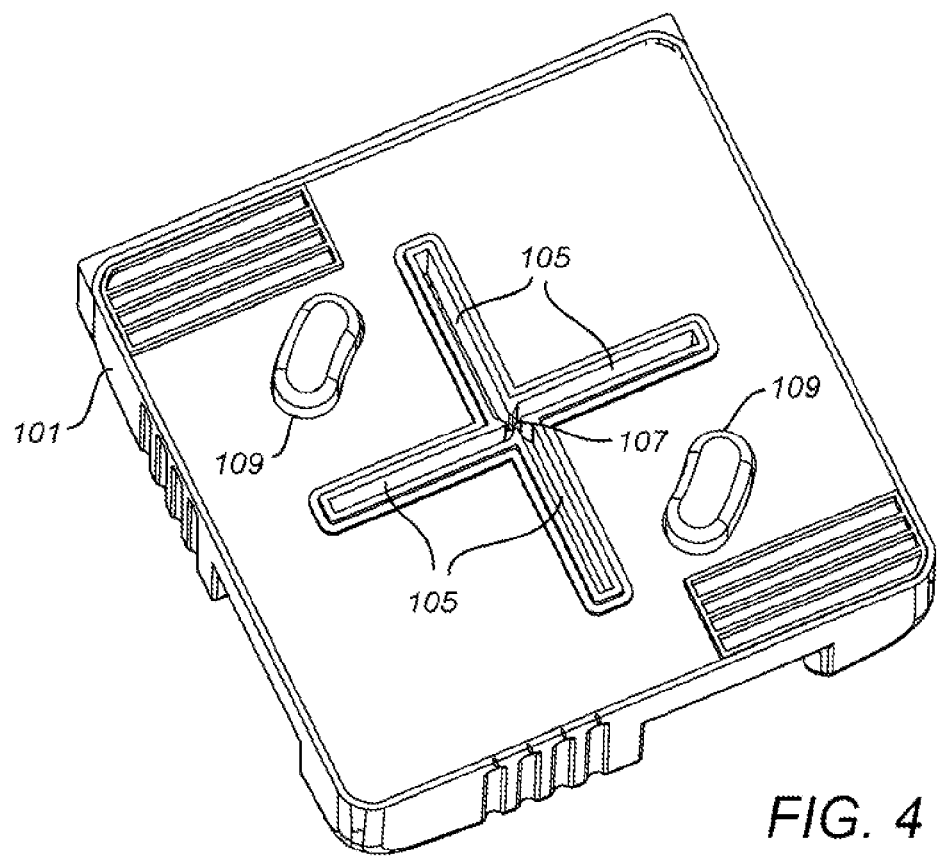
FIG. 4 is a bottom view of a base of the laser leveling device, according to an embodiment of the present invention.

FIG. 4 is a bottom view of a preferred embodiment of a base 101 of the present invention showing the notches 105 for temporarily hooking the end of a tape measure or other measuring device and a bull's eye-type opening 107 at the center of a base 101. FIG. 4 also shows two stand-offs 109. The stand-offs 109 are spring loaded and will compress when pressed against a wall or other work surface. The stand-offs 109 allow the user to align and position the base 101 into a desired location on a work surface before temporarily adhering the base 101 to a work surface, using adhesive tabs or other means for removably affixing the base 101 to a work surface. The stand offs 109 ensure that the adhesive tabs do not adhere to a work surface until the user levels the base 101 and presses the base 101 to a work surface.

Figure 5:
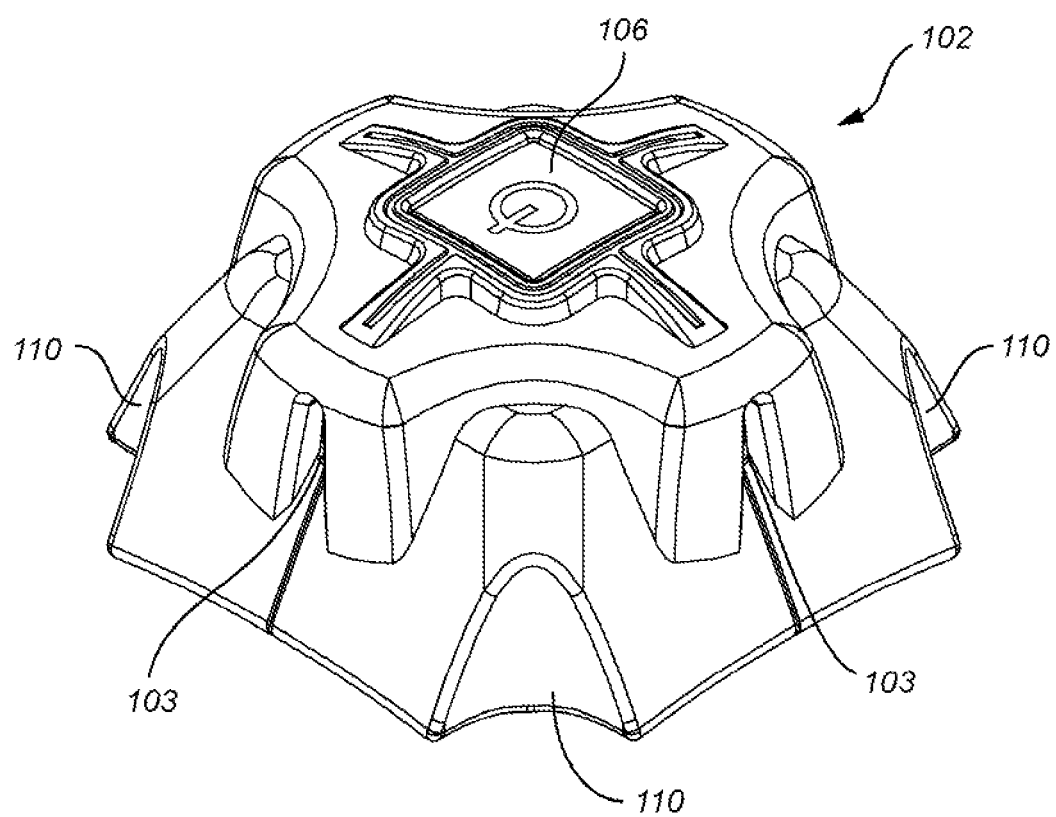
FIG. 5 is a perspective view of the laser assembly of the laser leveling device, according to an embodiment of the present invention.
Figure 6:
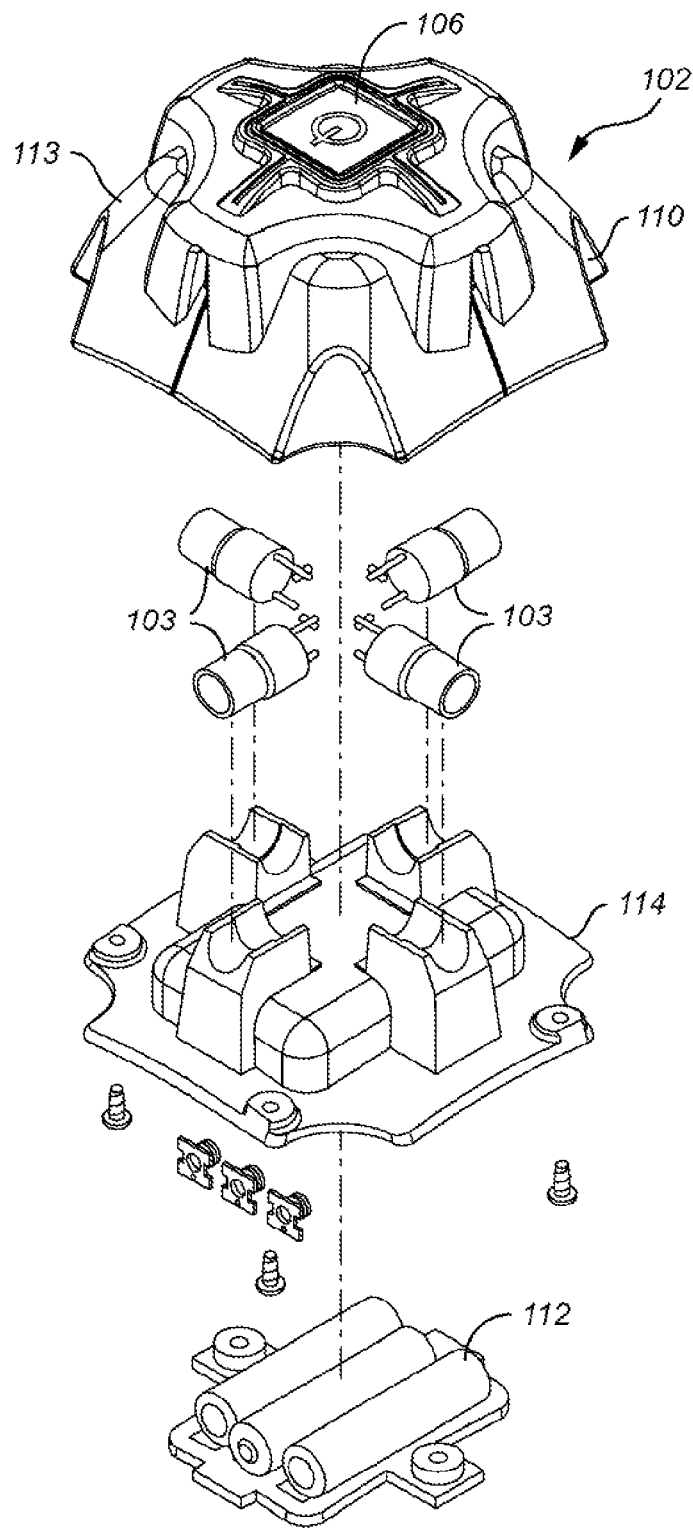
FIG. 6 is an exploded view of the laser assembly of the laser leveling device, according to an embodiment of the present invention.

FIG. 5 is a perspective view of a preferred embodiment of a laser assembly 102, showing two lasers 103, a power button 106, and corner depressions 110 for aligning and removably attaching the laser assembly 102 to a base 101. FIG. 6 is an exploded view of a preferred embodiment of a laser assembly 102, showing an upper enclosure 113, two lasers 103 a bottom enclosure 114, and batteries 112 for powering the lasers 103. The lasers 103 are aligned on the bottom enclosure 114 to allow the lasers 103 to emit laser lines at predetermined angles, including orthogonal angles. FIG. 6 also shows a power button 106 for powering the lasers 103 on and off. In a preferred embodiment, the power button 106 may be configured to activate an individual laser 103 or multiple lasers 103. A laser assembly 102 may also be configured with multiple power buttons for different lasers 103. In one example, without limitation, a single click of a power button 106 may enable horizontal lasers 103, a second click may enable vertical lasers 103, a third click may enable all lasers 103, and a subsequent may disable the lasers 103.

Figure 7:
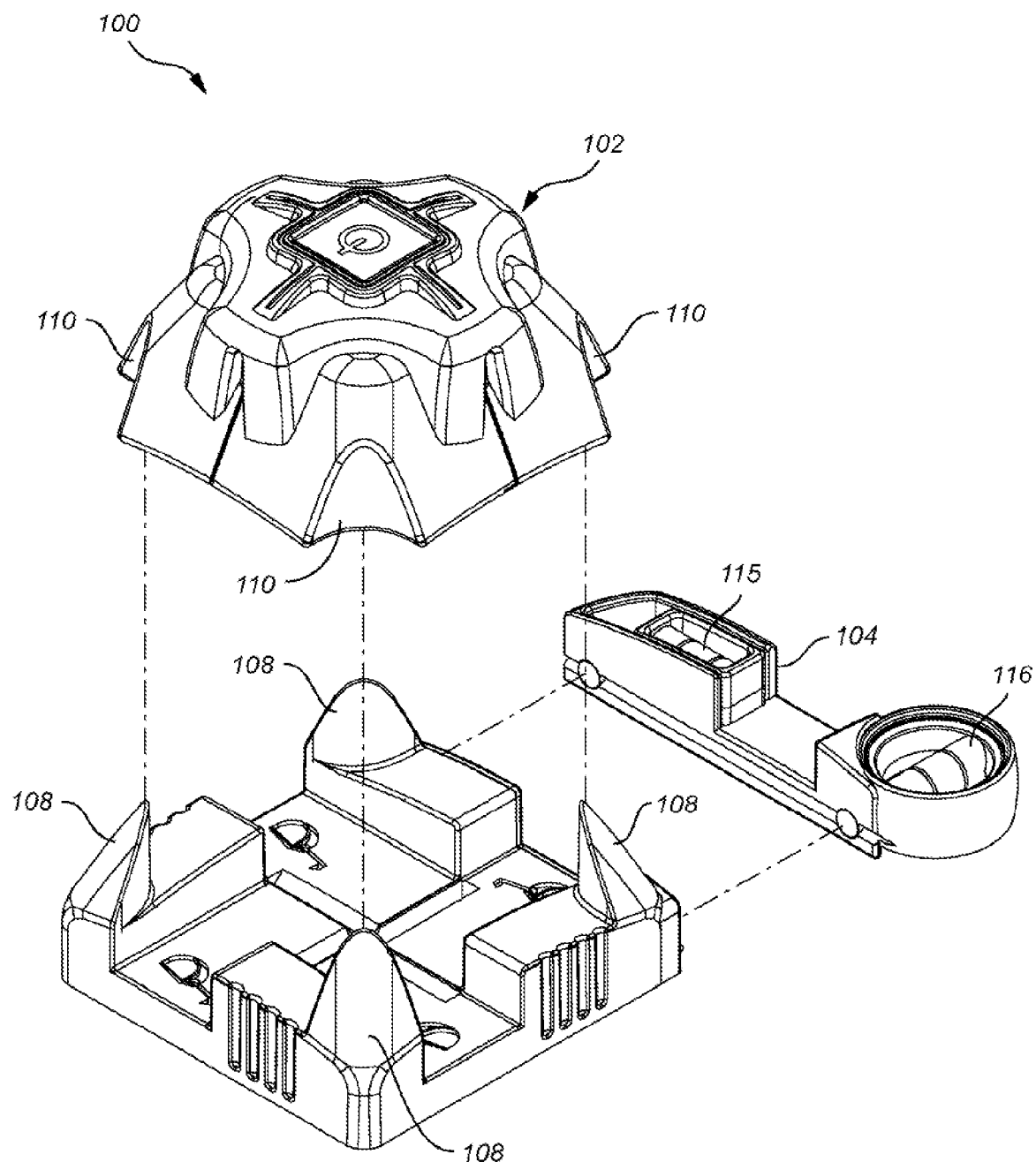
FIG. 7 is an exploded view of the laser leveling device, according to an embodiment of the present invention.

FIG. 7 is a perspective, exploded view of a preferred embodiment of a laser leveling device 100 of the present invention, including a base 101, a laser assembly 102, which is removably attachable to the base 101 by aligning the corner depressions 110 to the pillars 108 on the base 101. FIG. 7 also shows a level assembly 104, namely a torpedo level with both horizontal 115 and vertical 116 vials for leveling the base 101 and thus the laser lines emitted from a laser assembly 102. The level assembly 104 may be removably attachable to a base 101 or located adjacent to a base 101. The level assembly 104 may be magnetically attachable to a base 101. The magnets may include rare earth magnets. The level assembly 104 may be configured such that a laser line can be transmitted through the level assembly 104 without substantial interruption or interference. The level assembly 104 may be similar in length to the base 101 or may feature one or more extensions removably attached to either side of the level assembly 104. The level assembly 104 may include torpedo levels, bubble levels, or other leveling means. Alternatively, the lasers may be self-leveling.

In one embodiment, one or more of a plurality of bases 101 may be arranged on or near laser lines emitted from a laser assembly 102 and the laser lines may pass through an opening in the base 101 or under the base 101 without being interrupted. In other embodiments, the laser leveling device 100 may comprise a plurality of bases 101 and a plurality of laser assemblies 102 whereby laser assemblies 102 are removably attached to more than one base 101 affixed to a work surface, allowing laser lines to be emitted from a substantially orthogonal edge of the bases 101 across a work surface creating a grid of level reference lines to assist in project layout.

In other embodiments, a laser assembly 102 may be rotatably attached to a base 101 allowing the user to set various degrees of laser orientation and/or measurements from a base 101 affixed to a work surface. For example, the center of a base 101 may rotate on ball bearings. In another embodiment, the base 101 may include a rotatable center disc. The disc may be configured to temporarily receive the tape measure, for example, by holding a blade of the tape measure that extends out over laser limes emitted from the device to make measurement/layout marks at virtually any point along the laser line.

In yet other embodiments, a laser assembly 102 may be permanently affixed to a base 101 with each base 101 having its own laser assembly 102. A laser assembly 102 may also comprise self-leveling lasers eliminating the need for a separate level assembly 104.

In another embodiment, a laser assembly 102 may include lasers at angles other than at orthogonal angles. For example, the lasers may be provided at every 45 degrees and other common angles. The notches 105 at or near the center of the base 101 may additionally correspond to all angles of lasers emanating from the device 100.

In another embodiment, the base 101 may have a single rotatable notch rather than fixed measuring tape notches. In another embodiment, the tape measure for rotatable disc may feature an LCD or other display at the hook end of the tape measure to facilitate proper measurement. In another embodiment, the base 101 may include a pin and/or dowel at center to allow a tape measure to rotate freely and hover over the laser lines emanating from the device The laser leveling device 100 may be configured in various sizes and shapes. However, a size and shape that can be easily lifted and moved with one hand is preferred. For example, a base 101 may be approximately 5 inches by 2½ inches, without limitation. The thickness of the base 101 may be approximately ½ inch. Smaller depths may be utilized to ensure a measuring device used with the base 101 is not too far removed from the wall or other work surface, advantageously increasing accuracy in measurements along the emanating laser lines when using the device of the present invention. In a preferred embodiment, the bases 101 and the upper enclosure 113 and bottom enclosure 114 of a laser assembly 102 are manufactured from plastic materials to provide light weight and ease of use. However, other materials may also be used. In a preferred embodiment, the lasers 103 are laser diodes, but other lasers may be used.

Figure 8:
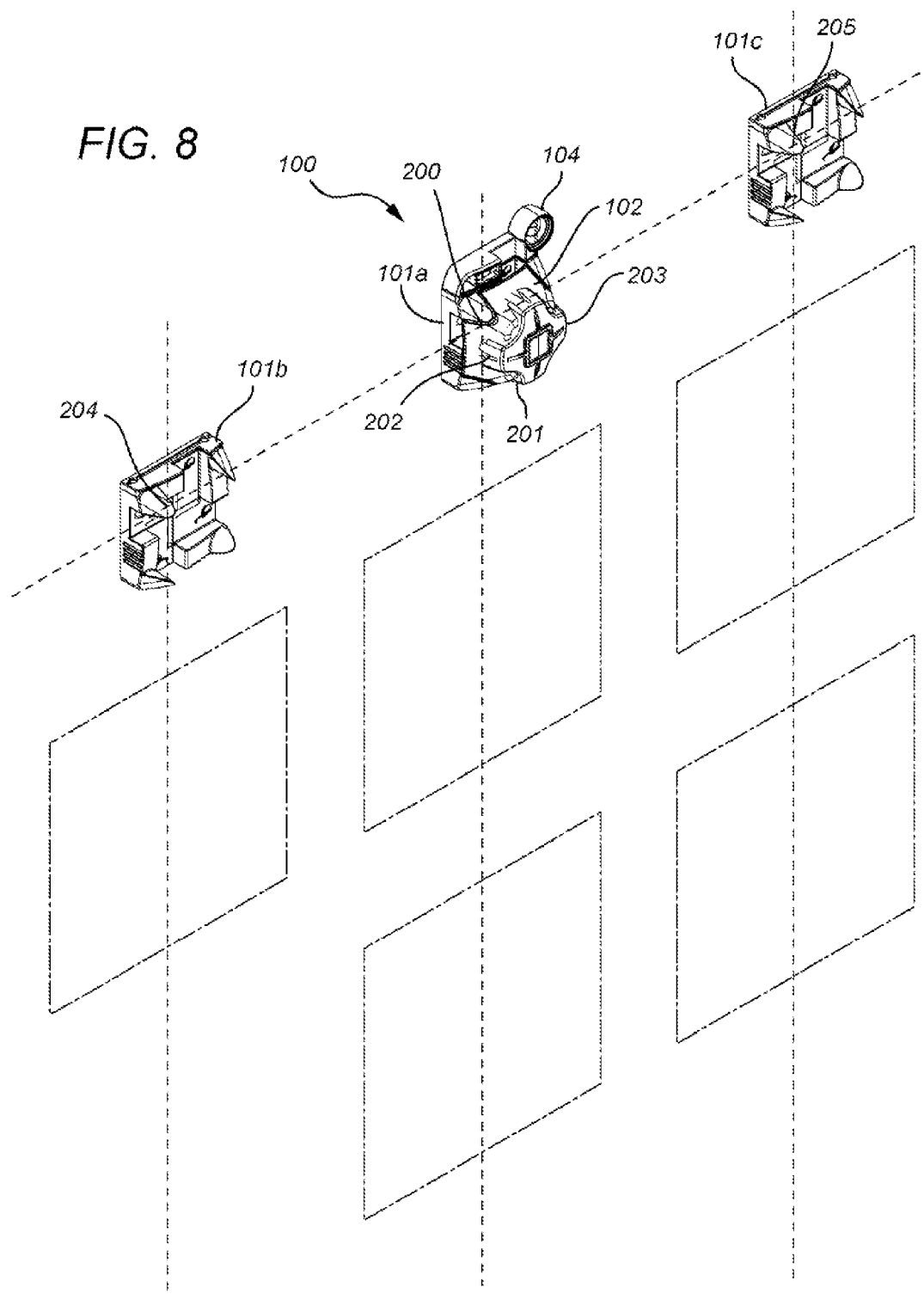
FIGS. 8-11 are illustrations of various applications of the laser leveling device, according to embodiments of the present invention.

FIGS. 8 to 11 provide illustrative applications of the laser leveling device 100. FIG. 8 shows the device 100 being used to hang picture frames. In this example, a base 101a is leveled using level assembly 104 and temporarily affixed to a wall at a desired location 200. A laser assembly 102 is attached to the level base 101a and used to emit laser lines vertically from a bottom side 201 and horizontally from each of its left side 202 and right side 203. Two additional bases 101b and 101c are located along the vertical level laser line at a desired distance 204, 205 and leveled using the level assembly 104. The laser assembly 102 may then be moved to each of the bases 101b and 101c to allow laser lines to be emitted from the bottom side of the laser assembly 102 to allow for reference points to be marked below such base 101b and 101c locations. Alternatively, in the example illustrated by FIG. 8, three laser assemblies 102 may be used, one for each base 101 affixed to the wall.

Figure 9:
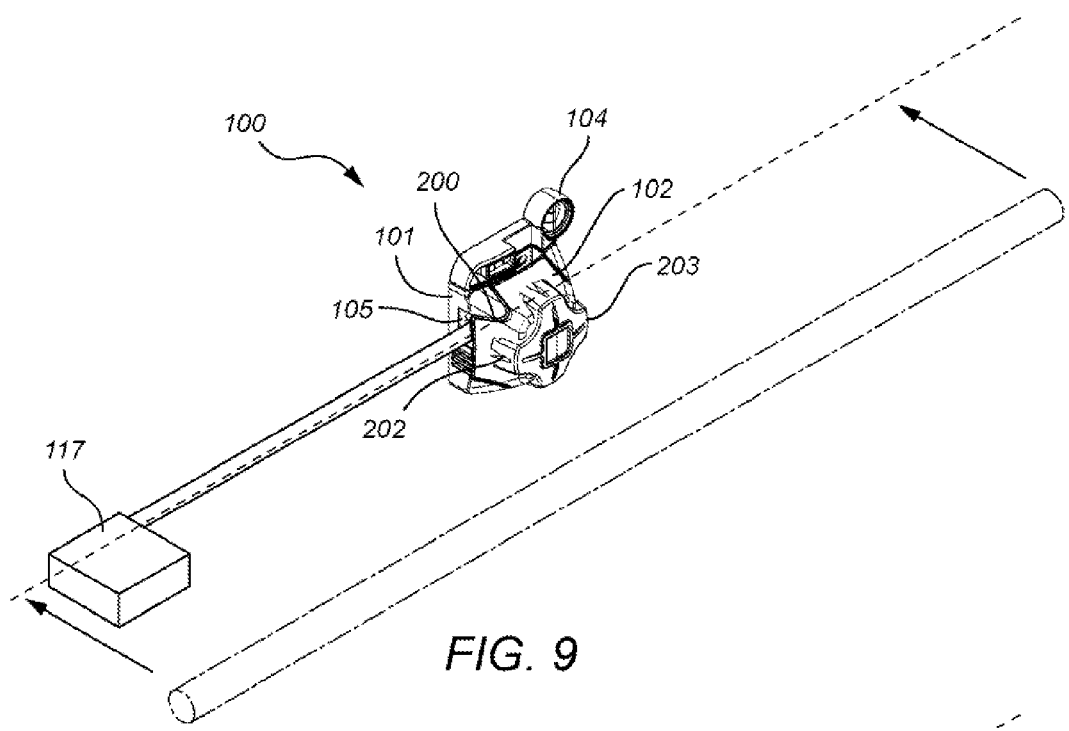

FIG. 9 illustrates use of the laser leveling device 100 to hang a curtain rod. In this example, the device 100 includes one base 101 and one laser assembly 102. The base 101 is leveled using a level assembly 104 and affixed to a wall at a predetermined location 200. A laser assembly 102 is attached to the base 101 and emits laser lines horizontally from each of its left 202 and right 203 sides. Measurements are taken along the level laser lines by attaching an end of a measuring device 117 at a notch 105 to identify the locations for installing the curtain rod.

Figure 10:
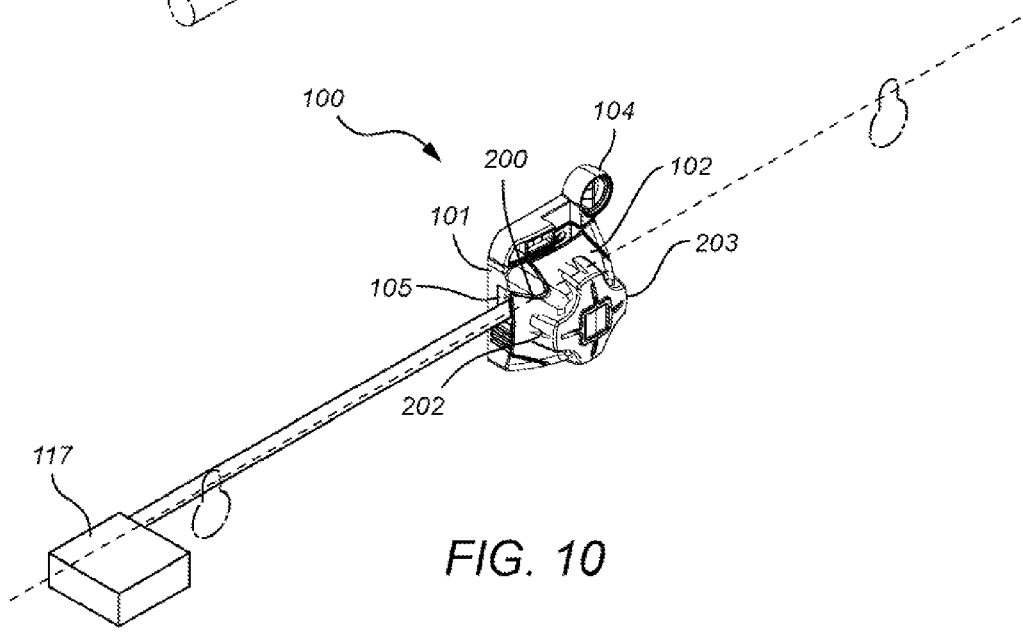

FIG. 10 illustrates use of the laser leveling device 100 to hang a frame with permanent hook slots. In this example, the device 100 includes one base 101 and one laser assembly 102. The base 101 is leveled using a level assembly 104 and affixed to a wall at a predetermined location 200. A laser assembly 102 is attached to the base 101 and emits laser lines horizontally from each of its left 202 and right 203 sides. Measurements are taken along the level laser lines by attaching an end of a measuring device 117 at a notch 105 to identify the locations for installing the frame.

Figure 11:
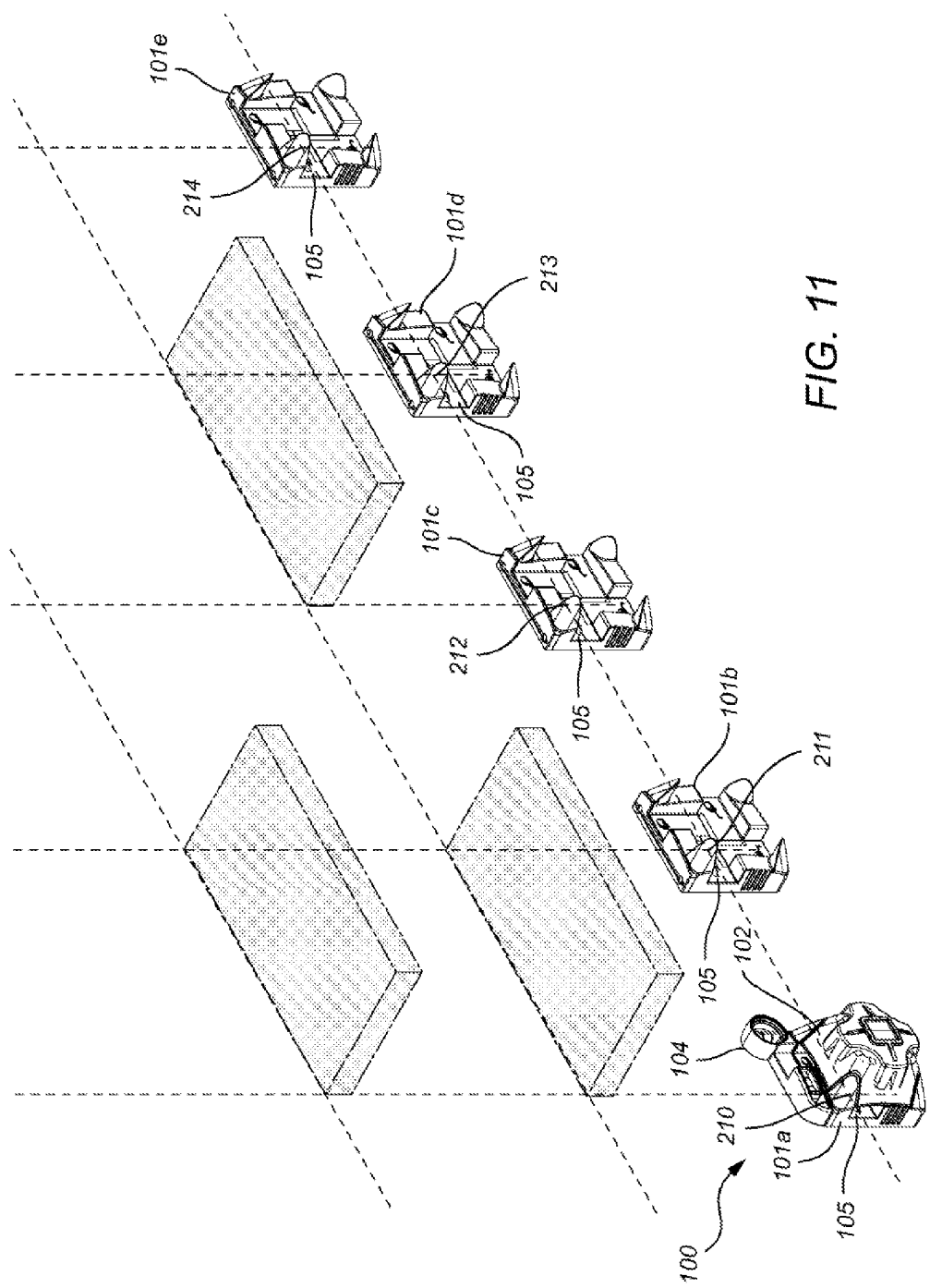

FIG. 11 illustrates use of the laser leveling device 100 to layout and hang a comprehensive shelving system. In this example, the device 100 includes five bases 101a-e and one or move laser assemblies 102. The first base 101a is located at a desired location on a wall 210 and leveled using a level assembly 104. The first base 101a is removably affixed to the wall using adhesive strips or tabs. A laser assembly 102 is attached to the base 101a, is powered on to emit level laser lines vertically from a top side and horizontally from each of its right and left sides. The second thru fourth bases 101b-e are positioned along the level horizontal laser line at desired distances 211, 212, 213, 214. The desired distances are determined by temporarily attaching an end of a measuring device at a notch 105 near the center of the base 101a. Each of the bases 101b-e is leveled using a level assembly 104 and each is removably affixed to a wall using an adhesive strip or tab. A laser assembly 102 is then moved to each of the bases 101b-e, and powered on to emit level laser lines vertically and horizontally at orthogonal angles. Measurements are taken along the level laser lines by attaching an end of a measuring device at a notch 105 for each base 101*b-e* to identify the locations for the shelving system.

It is to be understood that the foregoing description is intended to illustrate and not limit the scope of the invention, which is defined by the scope of the appended claims. Other aspects, advantages, and modifications are within the scope of the following claims.

What is claimed is:

1. A laser leveling device comprising:
 a plurality of bases;
 a means for removably attaching each of the plurality of bases to a surface;
 a means for centering the bases over a fixed point on said surface;
 a plurality of lasers;
 a means for removably and interchangeably connecting the plurality of lasers to each of the plurality of bases;
 a means for activating one or more of the plurality of lasers, causing laser lines to project across said surface and communicate with each of the plurality of bases attached to said surface;
 a means for leveling each of the plurality of bases on said surface; and
 a means for removably and interchangeably attaching a measuring device near the center of each of the plurality of bases.

2. A laser leveling device of claim 1 wherein the means for removably and interchangeably attaching a measuring device near the center of each of the plurality of bases is a plurality of notches located near the center of each of the plurality bases.

3. A laser leveling device of claim 2 wherein each of the plurality of notches is magnetized.

4. A laser leveling device of claim 1 wherein the plurality of lasers are arranged orthogonally.

5. A laser leveling device of claim 1 wherein the plurality of lasers are housed in a laser assembly comprising an upper enclosure and a lower enclosure, batteries for powering the lasers, a power switch for activating each of the plurality of lasers, and a means for removably and interchangeably connecting the laser assembly to one of the plurality of bases.

6. A laser leveling device of claim 1 wherein the means for leveling each of the plurality of bases on said surface is a level assembly consisting of a torpedo level with both vertical and horizontal leveling capability and a means for removably and interchangeably attaching the level assembly to one of the plurality of bases.

7. A laser leveling device of claim 1 wherein the means for leveling each of the plurality of bases comprises self-leveling lasers.

8. A laser leveling device comprising:
 a plurality of bases;
 a means for removably attaching each of the plurality of bases to a surface;
 a bull's eye opening at the center of each of the bases for aligning said bases over a fixed point on said surface;
 a laser assembly including a plurality of lasers arranged orthogonally, a plurality of batteries for powering the lasers, an upper enclosure and a lower enclosure to house the lasers and the batteries, a power switch for activating each of the plurality of lasers, and a means for removably and interchangeably connecting the laser assembly to one of the plurality of bases;
 a level assembly consisting of a torpedo level with both horizontal and vertical leveling capability and a means for removably and interchangeably attaching the level assembly to one of the plurality of bases;
 a plurality of notches near the center of each of the plurality of bases for inserting and removably attaching a measuring device; and
 a standoff on the bottom side of each of the plurality of bases to assist in leveling said bases prior to the bases being removably attached to said surface, whereby the standoff recedes into the base when pressed against the surface.

9. A laser leveling device comprising:
 a plurality of bases;
 a bull's eye opening at the center of each of the bases for aligning said bases over a fixed point on said surface;
 a laser assembly including a plurality of lasers and a means for removably and interchangeably connecting the laser assembly to one of the plurality of bases;
 notches near the center of each of the plurality of bases for inserting and removably attaching a measuring device to said bases to allow for measuring distances from the center point of said bases; and
 a means for leveling the plurality of bases.

10. A laser leveling device of claim 9 wherein the plurality of lasers are self-leveling lasers.

11. A laser leveling device comprising:
 a base;
 a bull's eye opening at the center of the base for aligning said base over a fixed point on said surface;
 notches near the center of the base for inserting and removably attaching a measuring device to said base to allow for measuring distances from the center point of said base;
 a laser assembly including a plurality of lasers and a means for removably and interchangeably connecting the laser assembly to the base; and
 a means for leveling the base.

12. A laser leveling device of claim 11 wherein the laser assembly rotates around the center axis of the base.

13. A laser leveling device of claim 11 wherein the notches rotate around the center axis of the base.

14. A laser leveling device of claim 11 wherein the plurality of lasers are self-leveling.

15. A laser leveling device comprising:
 a base;
 a bull's eye opening at the center of the base for aligning said base over a fixed point on said surface;
 notches near the center of the base for inserting and removably attaching a measuring device to said base to allow for measuring distances from the center point of said base;
 a plurality of lasers affixed to the base; and
 a means for leveling the base.

16. A laser leveling device of claim 15 wherein the center of the base rotates at various degrees around the center axis of the base.

17. A laser leveling device of claim 15 wherein the notches rotate around the center axis of the base.

18. A method for locating layout points for shelving or home decor on a wall comprising:
 removably attaching a first base on a wall;
 leveling the first base horizontally and vertically;
 removably attaching a plurality of lasers to the first base whereby the lasers project a first set of level reference lines across the wall on a horizontal and vertical axis to the first base;

removably attaching an end of a measuring device at the center of the first base and determining the proper location for said layout points along the first set of level reference lines;

removably attaching a second base and a third base along the first set of level reference lines at determined distances;

leveling the second base and the third base horizontally and vertically;

removably attaching a plurality of lasers to the second base whereby the lasers project a second set of level reference lines across the wall on a horizontal or vertical axis to said second base;

removably attaching an end of a measuring device at the center of the second base and determining the proper location for said layout points along the second set of level reference lines;

removably attaching a plurality of lasers to the third base whereby the lasers project a third set of level reference lines across the wall on a horizontal or vertical axis to said third base; and removably attaching an end of a measuring device at the center of the third base and determining the proper location for said layout points along the third set of level reference lines.

\* \* \* \* \*